US010995236B2

(12) United States Patent
Mistry et al.

(10) Patent No.: US 10,995,236 B2
(45) Date of Patent: May 4, 2021

(54) POLYURETHANE COATING COMPOSITION

(71) Applicant: SWIMC LLC, Cleveland, OH (US)

(72) Inventors: Jigar K. Mistry, Minneapolis, MN (US); Niteen Jadhav, Minneapolis, MN (US); Ivanka Krogh, Minneapolis, MN (US)

(*) Notice: Subject to any disclaimer, the term of this patent is extended or adjusted under 35 U.S.C. 154(b) by 256 days.

(21) Appl. No.: 15/771,228

(22) PCT Filed: Oct. 24, 2016

(86) PCT No.: PCT/US2016/058367
§ 371 (c)(1),
(2) Date: Apr. 26, 2018

(87) PCT Pub. No.: WO2017/074835
PCT Pub. Date: May 4, 2017

(65) Prior Publication Data
US 2018/0312719 A1    Nov. 1, 2018

Related U.S. Application Data

(60) Provisional application No. 62/247,541, filed on Oct. 28, 2015, provisional application No. 62/247,331, filed on Oct. 28, 2015, provisional application No. 62/247,413, filed on Oct. 28, 2015.

(51) Int. Cl.
| *C09D 175/06* | (2006.01) |
| *C09D 5/03* | (2006.01) |
| *C08G 18/42* | (2006.01) |
| *C09D 5/16* | (2006.01) |
| *C08G 18/80* | (2006.01) |
| *C09D 4/06* | (2006.01) |
| *C09D 5/08* | (2006.01) |

(52) U.S. Cl.
CPC ....... *C09D 175/06* (2013.01); *C08G 18/4202* (2013.01); *C08G 18/80* (2013.01); *C09D 4/06* (2013.01); *C09D 5/03* (2013.01); *C09D 5/032* (2013.01); *C09D 5/08* (2013.01); *C09D 5/1656* (2013.01); *C09D 5/1681* (2013.01); *C08G 2150/90* (2013.01)

(58) Field of Classification Search
CPC .. C09D 175/06; C09D 5/1656; C09D 5/1681; C09D 5/03; C09D 5/08; C09D 4/06; C09D 5/032; C08G 18/80; C08G 18/4202; C08G 2150/90
See application file for complete search history.

(56) References Cited

U.S. PATENT DOCUMENTS

| 3,274,007 | A | 9/1966 | Jones |
| 5,153,032 | A | 10/1992 | Landers et al. |
| 5,229,470 | A | 7/1993 | Nozaki et al. |
| 5,405,920 | A | 4/1995 | Barbee et al. |
| 5,790,304 | A | 8/1998 | Sanders et al. |
| 7,135,075 | B2 | 11/2006 | Buchheit et al. |
| 7,192,993 | B1 | 3/2007 | Sarangapani et al. |
| 7,342,057 | B2 | 3/2008 | Kumar et al. |
| 7,723,405 | B2 | 5/2010 | Braun et al. |
| 7,732,028 | B2 | 6/2010 | Monk et al. |
| 8,460,793 | B2 | 6/2013 | Doye et al. |
| 8,664,298 | B1 | 3/2014 | Ou et al. |
| 8,802,801 | B1 | 8/2014 | Kumar et al. |
| 8,865,315 | B2 | 10/2014 | Ozsahin |
| 8,968,459 | B1 | 3/2015 | Liu |
| 8,987,352 | B1 | 3/2015 | Ou et al. |
| 9,012,556 | B1 | 4/2015 | Mahn |
| 9,890,289 | B2 | 2/2018 | Mahn |
| 10,428,225 | B1 | 10/2019 | Mahn et al. |
| 2002/0045717 | A1 | 4/2002 | Grenda et al. |
| 2007/0142608 | A1 | 6/2007 | Laas et al. |
| 2008/0152815 | A1 | 6/2008 | Stephenson et al. |
| 2008/0268286 | A1* | 10/2008 | Ishihara ............ C08G 18/4063 428/704 |
| 2009/0018263 | A1 | 1/2009 | Marelli et al. |
| 2011/0293958 | A1 | 12/2011 | Benkoski et al. |
| 2013/0017405 | A1 | 1/2013 | Benkoski et al. |
| 2013/0261209 | A1 | 10/2013 | Kim et al. |

(Continued)

FOREIGN PATENT DOCUMENTS

| CA | 2788124 | 3/2013 |
| EP | 1591562 | 11/2005 |

(Continued)

OTHER PUBLICATIONS

M. Behzadnasab et al., "Preparation and characterization of linseed oil-filled urea-formaldehyde microcapsules and their effect on mechanical properties of an epoxy-based coating," Colloids and Surfaces A: Physicochem. Eng. Aspects, vol. 457 (2014), p. 16-26.
B. J. Blaiszik et al., "Nanocapsules for self-healing materials," Composites Science and Technology, vol. 68 (2008), p. 378-986.
S. J. Garcia, "Effect of polymer architecture on the intrinsic self-healing character of polymers," European Polymer Journal, vol. 53, (2014), p. 118-125.
M. W. Keller and N. R. Sottos, "Mechanical Properties of Microcapsules Used in a Self-Healing Polymer," Experimental Mechanics, vol. 46 (2006), p. 725-733.
G. Postiglione et al., "Effect of the plasticizer on the self-healing properties of a polymer coating based on the thermo reversible Diels-Alder reaction," Progress in Organic Coatings, vol. 78 (2015), p. 526-531.
W. Rui et al., "The Preparation and Research of Microcapsules in Self-healing Coatings," Advanced Materials Research, vol. 800 (2013), p. 471-475.

(Continued)

*Primary Examiner* — Rabon A Sergent
(74) *Attorney, Agent, or Firm* — Honigman LLP

(57) ABSTRACT

A coating composition, coated article and method for coating an article are provided. The composition is a coating composition that includes a polyurethane binder system further including a first resin component and a second resin component with a significant difference in hydroxyl numbers and crosslinked with an isocyanate. The composition, when applied to and cured on an article, imparts optimal antifingerprint, antireflecting, tactile, chemical agent-resistant, and self-healing effects to the coated article.

15 Claims, 4 Drawing Sheets

(56) References Cited

U.S. PATENT DOCUMENTS

| | | |
|---|---|---|
| 2014/0036223 A1 | 2/2014 | Zheng |
| 2014/0050928 A1 | 2/2014 | Gebauer et al. |
| 2014/0134426 A1 | 5/2014 | Henry |
| 2015/0104653 A1* | 4/2015 | Morita ................. C09D 167/04 428/423.7 |
| 2017/0204288 A1* | 7/2017 | Seeger ................. C09D 175/06 |

FOREIGN PATENT DOCUMENTS

| | | |
|---|---|---|
| EP | 2065218 | 6/2009 |
| EP | 2644668 | 10/2013 |
| WO | 8807069 | 9/1988 |
| WO | 2006137967 | 12/2006 |
| WO | 2007082153 | 7/2007 |
| WO | 2012105974 | 8/2012 |
| WO | 2012178193 | 12/2012 |
| WO | 2013188516 | 12/2013 |
| WO | 2014019843 | 2/2014 |
| WO | 2014099070 | 6/2014 |
| WO | 2015037280 | 3/2015 |

OTHER PUBLICATIONS

D. G. Shchukin, "Container-based multifunctional self-healing polymer coatings," Polym. Chem., vol. 4 (2013), p. 4871-4877.

T. Szabo et al., "Self-healing microcapsules and slow release microspheres in paints," Progress in Organic Coatings, vol. 72 (2011), p. 52-57.

D. Y. Wu et al., "Self-healing polymeric materials: A review of recent developments," Prog. Polym. Sci., vol. 33 (2008), p. 479-522.

J. Yang et al., "Microencapsulation of Isocyanates for Self-Healing Polymers," Macromolecules, vol. 41 (2008), p. 9650-9655.

Y. Zhao et al., "Self-healing coatings containing microcapsule," Applied Surface Science, vol. 258 (2012), p. 1915-1918.

Extended Search Report for European patent appl. No. 16860558.2, dated Apr. 2, 2019 (7 pages).

International Search Report for international appl. No. PCT/US20106/058367, dated Feb. 9, 2017 (4 pages).

* cited by examiner

POLYURETHANE COATING COMPOSITION

CROSS REFERENCE TO RELATED APPLICATIONS

This application claims priority from U.S. Provisional Application No. 62/247,541, filed 28 Oct. 2015, U.S. Provisional Application No. 62/247,413, filed 28 Oct. 2015 and U.S. Provisional Application No. 62/247,331, filed 28 Oct. 2015, each of which are incorporated herein by reference in its entirety.

BACKGROUND OF THE INVENTION

Powder coatings are solvent-free, 100% solids coating systems that have been used as low VOC, zero VOC, and/or low cost alternatives to traditional liquid coatings and paints.

Powder coating of parts to provide particular protective and aesthetic benefits is a common practice. For example, very low gloss powder coatings, typically fluoropolymers and acrylics, provide a desirable matte appearance and reduced glare that makes it difficult to detect surface defects, fingerprints, stains, and the like. However, it has been difficult to produce powder coatings of this type with consistent gloss, smoothness and clarity while also being compatible with other coatings chemistries. Moreover, the performance of the coating as a protective or barrier layer is sometimes compromised.

Conventionally, matte finishes are produced by creating a microtextured surface using competing chemistries in the powder composition that cure at different rates and may require different crosslinkers. Such techniques are limited in that they do not produce consistent and uniform coatings that can provide a high level of performance in a scalable way.

From the foregoing, it will be appreciated that there is a need for an effective way to produce powder coating finishes that show optimal performance and aesthetic benefits, including chemical agent resistance, self-healing properties, soft-to-touch or tactile effect, reduced detection of fingerprints (antifingerprinting), reduced reflectance (antireflecting), and very low gloss while still delivering optimal protective or barrier properties.

SUMMARY

The present description provides a polyurethane coating composition. The composition demonstrates several beneficial effects, including providing an antifingerprinting, antireflecting, soft-to-the-touch, chemical agent-resistant, ultra matte finish, and self-healing coating without compromising any protective or barrier properties of the composition. These beneficial effects may be the result of a unique balance of oleophobic and hydrophobic properties in the coating composition.

In one embodiment, the present description provides coating composition including a polyurethane binder resin system. The binder resin system includes a first resin component with a hydroxyl number of at least 150 and a second resin component with a hydroxyl number of at least 15, along with a crosslinking agent. The first and second resin components are present in a ratio of 1:1 to 1:4.

In another embodiment, the present description provides a coated article. The article includes a substrate and a cured coating applied and formed on the substrate. The cured coating is formed from a coating composition that includes a polyurethane binder resin system that further includes a first resin component with a hydroxyl number of at least 150 and a second resin component with a hydroxyl number of at least 15, along with a crosslinking agent. The first and second resin components are present in a ratio of 1:1 to 1:4.

In yet another embodiment, the present description provides a method of coating a substrate. The method includes steps of providing a substrate and applying a coating composition to the substrate. The coating composition includes a polyurethane binder resin system that further includes a first resin component with a hydroxyl number of at least 150 and a second resin component with a hydroxyl number of at least 15, along with a crosslinking agent. The first and second resin components are present in a ratio of 1:1 to 1:4. Once the coating is applied to the substrate, the coated substrate is heated to form a cured coating.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the accompanying drawings and the description below. Other features, objects, and advantages of the invention will be apparent from the description and drawings, and from the claims.

SELECTED DEFINITIONS

Figure 1:
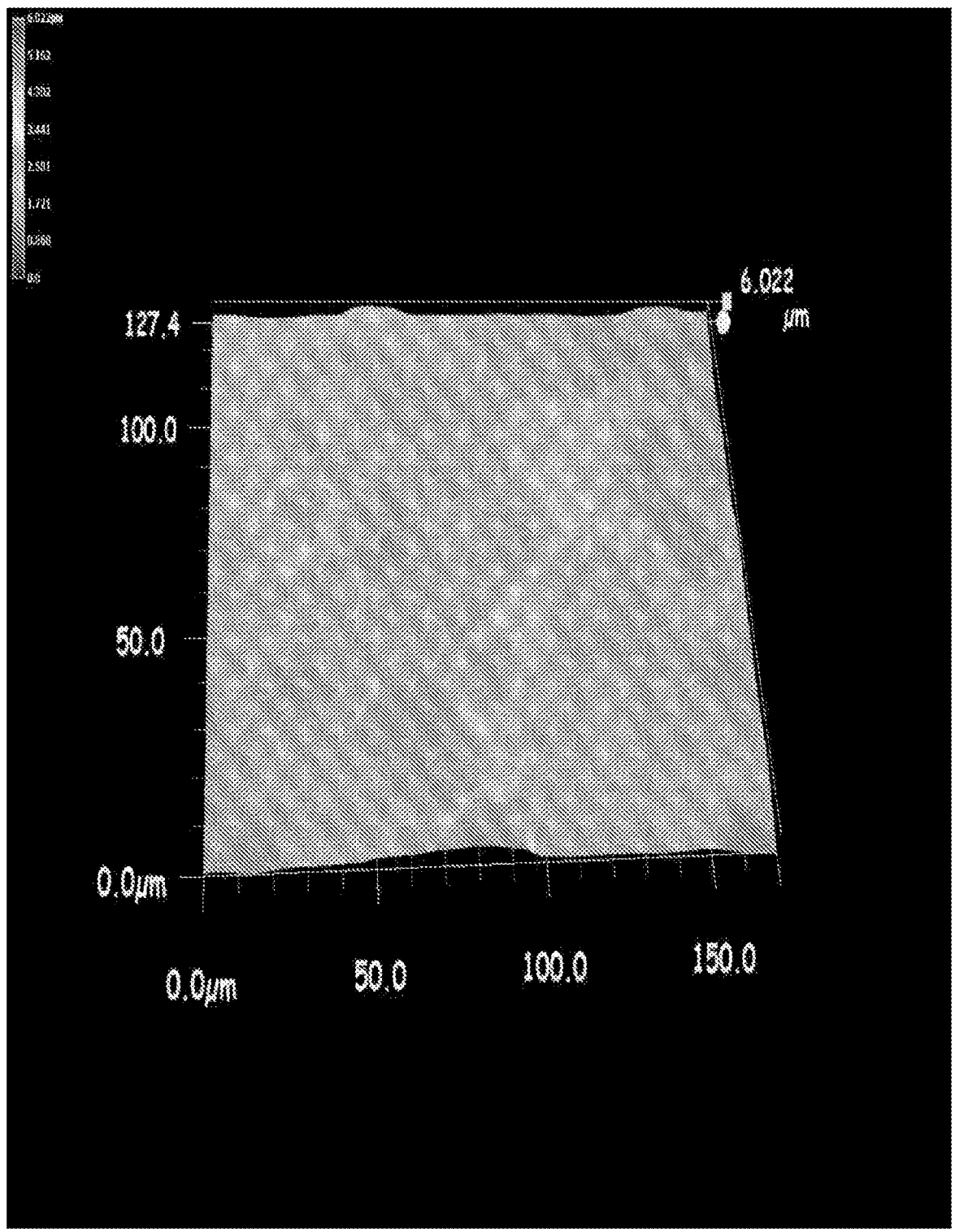
FIG. 1 shows a 250X magnified a digital microscopic image of a three-dimensional profile of a cured coating that demonstrates the intermingling of partially incompatible polymer domains.

Unless otherwise specified, the following terms as used herein have the meanings as provided below.

The term "component" refers to any compound that includes a particular feature or structure. Examples of components include compounds, monomers, oligomers, polymers, and organic groups contained there.

The term "substantially free" of a particular compound or component means that the compositions of the present invention contain less that 5 percent by weight of the recited compound or component based on the total weight of the composition. The term "essentially free" of a particular compound or component means that the compositions of the present invention contain less than 2 percent by weight of the recited compound or component. The term "completely free" of a particular compound or component means that the compositions of the present invention contain less than 1 percent by weight of the recited compound or component.

The term "crosslinker" refers to a molecule capable of forming a covalent linkage between polymers or between two different regions of the same polymer.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

Unless otherwise indicated, a reference to a "(meth) acrylate" compound (where "meth" is bracketed) is meant to include both acrylate and methacrylate compounds.

The term "polycarboxylic acid" includes both polycarboxylic acids and anhydrides thereof.

The term "oleophobic," as used herein, refers to a coating composition or surface of a coated article with the physical property of repelling oil or preventing the deposition of oil on the surface. The terms "oleophobic" and "lipophobic" may be used interchangeably herein.

By "hydrophobic" is meant a coating composition or surface of a coated article with the physical property of repelling water or preventing the wetting of the coated surface.

"Soft touch" or "soft to the touch," as used herein refers to a coated surface with a low gloss velvet-like appearance that simulates the sense of touch. The terms are used interchangeably herein with the term "tactile" or "tactile feel."

As used herein, the term "antifingerprint effect" refers to a coated surface where a fingerprint on the surface is invisible or only slightly visible in visible light. As used herein, the term also refers to a coated surface where a fingerprint may be visible under ultraviolet light.

The term "antireflective coating" refers to a coated surface that shows reduced reflection relative to the same surface without a coating. As used herein, the reflection is reduced as a function of increased surface roughness.

By the term "self healing coating" is meant a coating that has the intrinsic ability to correct surface damage caused by normal usage. As used herein, the term may refer to coatings that can repair damage with the application of an external stimulus or without any external stimulus.

The term "chemical agent resistant coating" or "CARC coating" refers to a coating typically but not exclusively used for military vehicles and equipment that can resist damage caused by chemical and biological weapons. A substrate coated with a CARC coating can be easily decontaminated with various chemicals without erosion or damage of the coating.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The invention described herein includes a coating composition, methods for making and applying a coating composition, and articles coated with a coating composition. In an aspect, a cured coating formed from the coating composition has a finish that can provide desirable aesthetic properties while also being superdurable and having high performance capabilities. Accordingly, in some embodiments, the coating compositions, methods and articles described herein provide a cured coating with one or more of the following properties or effects: antifingerprinting, antireflecting, soft or tactile feel, self-healing, chemical agent resistance, and the like. In an aspect, these effects may be due to the coating composition having both oleophobic and hydrophobic properties. Moreover, a cured coating formed from the coating composition provides a consistent and uniform appearance without compromising performance attributes like corrosion resistance, durability, and the like.

In an embodiment, the present description provides a coating composition. The coating composition may be any type of organic, inorganic or hybrid coating, and any type of liquid coating composition, powder coating composition, or combinations thereof. The coating composition may be oleophobic, hydrophobic, or preferably demonstrate a balance of hydrophobic and oleophobic properties. The coating composition generally includes a film forming resin or binder and if required, a curing or crosslinking agent for the resin. The binder may be selected from any resin or combination of resins or resin components that provides the desired film properties. Suitable examples of polymeric binders include thermoset and/or thermoplastic materials, and can be made with epoxy, polyester, polyurethane, polyamide, acrylic, polyvinylchloride, nylon, fluoropolymer, silicone, other resins, or combinations thereof. Polyurethane materials are especially preferred.

In an embodiment, the binder resin described herein is a polyurethane material including at least a first resin component and a second resin component. In an aspect, the first resin component and second resin component are each independently a hydroxyl-functional compound capable of reacting with a crosslinker. In a preferred aspect, the first resin component and second resin component are derived from distinct hydroxyl-functional compounds such that the first resin component and second resin component are not identical.

In an embodiment, the hydroxyl-functional compound is a polyester. Suitable polyesters include, without limitation, those prepared by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may also be used.

In an embodiment, the first resin component is a first hydroxyl-functional polyester, preferably a superdurable hydroxyl-functional polyester. In an aspect, the hydroxyl-functional polyester has a hydroxyl (OH) number of at least 150, preferably 150 to 325, more preferably 160 to 300, and most preferably 170 to 240. In an aspect, the hydroxyl-functional polyester has a Tg of about 10° C. to 90° C., preferably 20° C. to 80° C., more preferably 40° C. to 60° C.

In an embodiment, the second resin component is a second hydroxyl-functional polyester, preferably a superdurable hydroxyl-functional polyester. In an aspect, the hydroxyl-functional polyester has a hydroxyl (OH) number of no more than about 50, preferably 10 to 40, more preferably 15 to 35. In an aspect, the hydroxyl-functional polyester has a glass transition temperature (Tg) of about 10° C. to 90° C., preferably 20° C. to 80° C., more preferably 40° C. to 60° C.

In an embodiment, the first hydroxyl-functional polyester and second hydroxyl-functional polyester are distinguishable in terms of their hydroxyl numbers. The difference in hydroxyl numbers between the first and second polyesters is at least 100, preferably 140 to 200, more preferably 135 to 215.

In an embodiment, the first hydroxyl-functional polyester and second hydroxyl-functional polyester are distinguishable in terms of their Tg values. The difference in Tg (ΔTg) is no more than about 10° C., preferably about 5 to 8° C.

The amount of the first and second resin component in the coating composition described herein depends on the desired properties of the coating. Without limiting to theory, it is believed that the relative amount of each resin component contributes to the properties of the cured coating. Accordingly, in an aspect, the first and second resin components are present in a ratio of at least 1:1, preferably 1:1 to 1:5, more preferably 1:1.5 to 1:3. At relative ratios of the first and second resin components of greater than about 1:5, the cured coating still demonstrates good performance, but other desirable properties such as the soft-to-touch effect and the ultra matte finish of the coating fall off.

In an embodiment, the polyurethane binder system is derived by the reaction of the first hydroxyl-functional polyester and second hydroxyl-functional polyester with a suitable hydroxyl-reactive crosslinker. Examples of hydroxyl-reactive crosslinkers include, without limitation, phenoplasts, aminoplasts, isocyanate-functional compounds, dianhydrides, or mixtures thereof. Isocyanate-functional compounds are preferred.

Suitable isocyanate-functional compounds include, without limitation, blocked or unblocked aliphatic, cycloaliphatic or aromatic di-, tri-, or poly-valent isocyanates, such as hexamethylene diisocyanate, isophorone diisocyanate and the like. Further non-limiting examples of generally suitable unblocked or blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, unblocked or blocked isocyanates are used that have an $M_n$ of at least about 300, more preferably at least about 650, and even more preferably at least about 1,000.

Blocked isocyanates are preferred. Suitable isocyanates may be internally blocked or externally blocked. Examples of suitable polymeric blocked isocyanates include biuret, uretdione, diisocyanate, isocyanurate of a diisocyanate, a trifunctional "trimer," and mixtures thereof, and the like.

The amount of crosslinker needed will depend on the desired coating properties. In an aspect, the crosslinker is an isocyanate and is present in a stoichiometric amount. In a preferred aspect, the isocyanate crosslinker is present in an amount that provides an NCO:OH ratio of 1:1 to 1:2, preferably 1:1 to 1:1.5, more preferably 1:1 to 1:1.1.

The composition described herein may include other additives. These other additives can improve the application of the coating, the melting and/or curing of that coating, or the performance or appearance of the final coating. Examples of optional additives which may be useful in the composition include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, and edge coverage additives.

Coatings are intended to provide both protection to the underlying substrate as well as enhancing or improving appearance or usability. Accordingly, the cured coatings described herein show optimal corrosion resistance and demonstrate a number of other useful properties that are desirable in various different uses. For example, a low gloss appearance is desirable for some automotive interior parts, wheel rim, bumpers, and the like. Similarly, block resistance, which refers to the ability to resist the formation of oil, dirt and water marks, is a desirable property for most coated objects, including home appliances, office furniture, heavy machinery, playground equipment, and the like. Users may desire a particular texture or feel which can also be imparted to a coated object. Finally, certain military vehicles and equipment require resistance to penetration by chemical and biological weapons. Such coatings are commonly known as chemical agent resistant coatings or CARC.

In an aspect, a cured coating formed from the composition described herein has extremely low gloss and low sheen and provides an antireflecting effect. A cured coating formed from the coating composition demonstrates 20°-gloss ratings of less than 10, preferably less than 5, more preferably less than 1, and demonstrates 60°-gloss ratings of less than 20, preferably less than 10, more preferably less than 5.

Conventionally, a low gloss low sheen finish is achieved by incorporating fillers, matting agents or flattening pigments into the coating composition. For example, a conventional low gloss powder coating with a matte finish would include at least 10%, 15%, or even 25% by weight filler based on the total weight of the solids in the composition. Surprisingly, and in contrast to conventional practice in the industry, the coating composition described herein includes less than 5% by weight filler, and is preferably substantially free of filler. Despite this significant reduction in filler amount, a cured coating formed from the coating composition demonstrates lower 20°- and 60°-gloss ratings than conventional matte coating compositions. Moreover, the coating demonstrates optimal corrosion resistance as well.

In an aspect, a cured coating formed from the composition described herein provides a microtextured surface. This property can be measured by the surface roughness of the cured coating. As measured by a profilometer according to ASTM D7127 (Standard Test Method for Measurement of Surface Roughness of Abrasive Blast Cleaned Metal Surfaces Using a Portable Stylus Instrument) and reported as Rz values, the surface roughness of the cured coating described herein is greater than zero, preferably about 10 to 40 μm, more preferably about 15 to 30 μm.

In an aspect, the cured coating described herein provides blocking resistance. A surface coated with the composition described shows antifingerprint effect, such that any fingerprint deposited on the surface of the coating is not seen visible under white light and/or to the naked eye.

In some embodiments, the cured coating described herein provides a coated surface with a soft-to-the-touch or tactile feel, i.e. a surface texture similar to velvet. In addition to the low gloss, low sheen finish, this soft touch texture provides a pleasing aesthetic effect for a variety of uses, including home appliances, office furniture, and the like.

An important property of many coatings is the ability to resist damage. Many coatings are scratched or eroded during normal use, and this sort of damage leads to degradation of the coating and ultimately to corrosion and failure of the coated article. Repairing such defects is time-consuming and costly, and therefore, a material that can repair itself, i.e. undergo self-healing, either with or without the application of an external stimulus (such as heat, for example) is particularly useful as self-healing of defects in a coating provides long-term protection and reduces the amount and frequency of required maintenance.

Accordingly, in some embodiments, the cured coatings described herein demonstrate self-healing properties. Conventionally, self-healing coatings typically include microencapsulated reagents in the polymer matrix of the coating. When the coating is damaged, these reagents are released and flow into the damaged area to fill the defect and thereby "heal" the coating.

Surprisingly, and in contrast to conventional forms of self-healing, the cured coating described herein is capable of repairing any surface damage to the coating without the use of additional self-healing reagents. When a defect, such as a scratch or a burnish mark, for example, is formed on a coated surface, the coating composition flows just enough to fill the defect. In an aspect, the self-healing may be heat-assisted, i.e. the process requires the application of an external stimulus, preferably heat. For example, when a defect, especially a scratch, is formed, the coating is heated to a temperature of about 90 to 100° C. causing the coating composition to melt and flow to fill in the defect. In another aspect, the self-healing does not require the application of any form of external stimulus. For example, when a defect such as a burnish mark is formed on the surface, the coating composition will flow out to repair the burnish over time and at ambient temperature.

Moreover, the cured coating described herein undergoes self-healing in a manner that restores substantially all of the coating's barrier and functional properties, and specifically, the coating's corrosion resistance. This is in contrast to conventional self-healing coatings where the microencapsulated self-healing reagents tend to seal the defect but do not fully restore the coating's barrier properties.

The mechanism for the various properties of the cured coating described herein is not well understood. Without limiting to theory, it is believed that the first resin component and second resin component represent mutually incompatible domains within the polymer matrix. The two domains are incompatible because of the significant difference in hydroxyl numbers and the slight difference in Tg between the domains. However, because the rheology and crosslink characteristics of both resin components are substantially similar at cure temperature, the two domains form intertwined chains of each domain with the other and produce a partially compatible polymer matrix. Ideally, each polymer matrix (i.e. resin component+crosslinker) acts as an included matrix (continuous phase) as well as an excluded matrix (secluded/discontinuous phase). Digital microscopic imaging of an aluminum panel coated with the coating composition described herein demonstrates the intertwined polymer domains and is shown in FIG. 1.

Such intermingling of otherwise incompatible polymer domains gives rise to a microtopography or microtexture that allows incident light to be absorbed by the coating instead of the light scattering in all directions that typically occurs with low gloss, matte finish coatings. The microtextured surface is able to scatter incident light internally within the depth of the internal coating, with both absorption and internal reflection taking place. This leads to the low gloss, antifingerprint, antireflecting and tactile properties of the coating.

Similarly, when a scratch or other defect is formed, both domains are exposed. As the domains are partially compatible, they tend to flow into each other. However, the same domains are also partially incompatible and therefore tend to flow away from each other because of the relative difference in their surface energies. Without limiting to theory, it is believed that these two phenomena combine to produce the observed self-healing effect.

In an embodiment, the present description provides methods for making the coating composition described herein. In an aspect, where the coating composition is a powder composition, the first resin component and second resin component are dry mixed together with the crosslinker and any optional additives. Techniques for preparing powder compositions are known to those of skill in the art. Mixing can be carried out by any available mechanical mixer or by manual mixing. Some examples of possible mixers include Henschel mixers (available, for example, from Henschel Mixing Technology, Green Bay, Wisc.), Mixaco mixers (available from, for example, Triad Sales, Greer, S.C. or Dr. Herfeld GmbH, Neuenrade, Germany), Marion mixers (available from, for example, Marion Mixers, Inc., 3575 3rd Avenue, Marion, Iowa), invertible mixers, Littleford mixers (from Littleford Day, Inc.), horizontal shaft mixers and ball mills. Preferred mixers would include those that are most easily cleaned.

Powder coatings are generally manufactured in a multi-step process. Various ingredients, which may include resins, curing agents, pigments, additives, and fillers, are dry-blended to form a premix. This premix is then fed into an extruder, which uses a combination of heat, pressure, and shear to melt fusible ingredients and to thoroughly mix all the ingredients. The extrudate is cooled to a friable solid, and then ground into a powder. Depending on the desired coating end use, the grinding conditions are typically adjusted to achieve a powder median particle size of about 25 to 150 microns.

The optional additives may be added prior to extrusion and be part of the base powder, or may be added after extrusion. Suitable additives for addition after extrusion include materials that would not perform well if they were added prior to extrusion; materials that would cause additional wear on the extrusion equipment, or other additives.

The extruded mixture is solidified by cooling, and then ground or pulverized to form a powder. Other methods may also be used. For example, one alternative method uses a binder that is soluble in liquid carbon dioxide. In that method, the dry ingredients are mixed into the liquid carbon dioxide and then sprayed to form the powder particles. If desired, powders may be classified or sieved to achieve a desired particle size and/or distribution of particle sizes.

The resulting powder is at a size that can effectively be used by the application process. Practically, particles less than 10 microns in size are difficult to apply effectively using conventional electrostatic spraying methods. Consequently, powders having median particle size less than about 25 microns are difficult to electrostatically spray because those powders typically have a large fraction of small particles. Preferably the grinding is adjusted (or sieving or classifying is performed) to achieve a powder median particle size of about 25 to 150 microns, more preferably 30 to 70 microns, most preferably 30 to 50 microns.

In some embodiments, the present description includes methods for coating a substrate or article with the coating composition described herein. The method includes steps of providing a substrate and applying the described coating composition to the substrate. The substrate is then heated to form a cured coating on the substrate. Standard conditions of temperature and time required to form a cured coating are well known in the art. For example, the coating composition described herein may be cured by heating at temperatures of preferably 250 to 450° F., more preferably 300 to 400° F., and most preferably 350 to 400° F., for a time period of about 10 to 60 minutes, more preferably 15 to 30 minutes.

The coating composition described herein may be applied to a wide variety of substrates to form a wide variety of coated articles. The compositions and methods described herein may be used with a wide variety of substrates, including metal, non-metal, glass, ceramic, polymer, plastic, and the like.

Typically but not exclusively, the powder coating compositions described herein are used to coat metal substrates, including without limitation, unprimed metal, clean-blasted metal, and pretreated metal, including plated substrates and ecoat-treated metal substrates. Typical pretreatments for metal substrates include, for example, treatment with iron phosphate, zinc phosphate, and the like. Metal substrates can be cleaned and pretreated using a variety of standard processes known in the industry. Examples include, without limitation, iron phosphating, zinc phosphating, nanoceramic treatments, various ambient temperature pretreatments, zirconium containing pretreatments, acid pickling, or any other method known in the art to yield a clean, contaminant-free surface on a substrate.

Various articles may be coated using the composition and method described herein. Examples include, without limitation, automotive parts (interior and exterior parts), military vehicles and equipment, home appliances, office furniture, heavy machinery, playground equipment, and the like.

In an aspect, the coating compositions described herein may be applied to substrates previously coated by various processes known to persons of skill in the art, including for example, ecoat methods, plating methods, and the like. There is no expectation that substrates to be coated with the compositions described herein will always be bare or unprimed metal substrates.

The coating composition described herein may be applied to a substrate or an article by various means known in the art including, for example, the use of fluid beds and spray applicators. Most commonly, an electrostatic spraying process is used, wherein the particles are electrostatically charged and sprayed onto an article that has been grounded so that the powder particles are attracted to and cling to the article. After coating, the article is heated. This heating step causes the powder particles to melt and flow together to coat the article. Optionally, continued or additional heating may be used to cure the coating. Other alternatives such as UV curing of the coating may be used.

The coating is cured on the substrate or article, and such curing may occur via continued heating, subsequent heating, or residual heat in the substrate. In another embodiment of the invention, if a radiation curable powder coating base is selected, the powder can be melted by a relatively short or low temperature heating cycle, and then may be exposed to radiation to initiate the curing process. One example of this embodiment is a UV-curable powder. Other examples of radiation curing include using UV-vis, visible light, near-IR, IR, e-beam, microwave radiation, and the like.

Preferably, when cured on the substrate or article, the coating has desirable physical and mechanical properties, including antifingerprinting, antireflectance, self-healing, chemical agent resistamce, and the like. Typically, the final film coating will have a thickness of 10 to 200 microns, preferably 20 to 150 microns, more preferably 25 to 125 microns. The thickness of the final film will vary depending on the end use and the desired coating properties.

In some embodiments, the coating composition described herein may be provided as a patch stick. Conventionally, when a coating is damaged, the coating begins to erode. In a self-healing coating, this local erosion can be healed, but over time, there is not enough left to fully repair the defect, and the self-healing ability of the polymeric binder system does little more than seal the defect rather than healing it. In such situations, it is conventional to use a patch stick to properly repair the defect. The patch stick allows a small amount of a coating composition to be applied locally to the defect in order to repair it. However, conventional patch sticks do not provide a uniform coating, and after curing, the patched area often has a different appearance and does not provide optimal barrier properties relative to the original coating.

Surprisingly, and in contrast to convention in the industry, the composition described herein, when used as a patch stick, provides a uniform coating at the defect site and the barrier properties of the coating are fully restored following repair with the patch stick.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from various suppliers.

Example 1

Low Gloss Coating

Test panels were prepared by electrostatically spraying onto commercially available metal panels the following powder coating compositions: a conventional matte or flat powder, a matte polyurethane coating, and the inventive low gloss composition. The coated panels were then heated for 15 minutes at 375° F. to form cured coatings, and gloss ratings at 20°, 60°, and 80° were taken, according to the procedure described in ASTM D523 (Standard Method for Specular Gloss). Results are shown in Table 1 below.

TABLE 1

Gloss ratings for various powder coatings

|  | 20° Gloss | 60° Gloss | 85° Gloss |
|---|---|---|---|
| Conventional Matte/Flat Powder | 1-10 GU | 3-15 GU | 20-45 GU |
| Matte Polyurethanes | 2-15 GU | 3-20 GU | 20-45 GU |
| Inventive coating | ≤1 (0.5-1.0) GU | ≤3 (2.0-3.0) GU | ≤30 (25-30) GU |

Example 2

Antifingerprinting Effect

Figure 2:
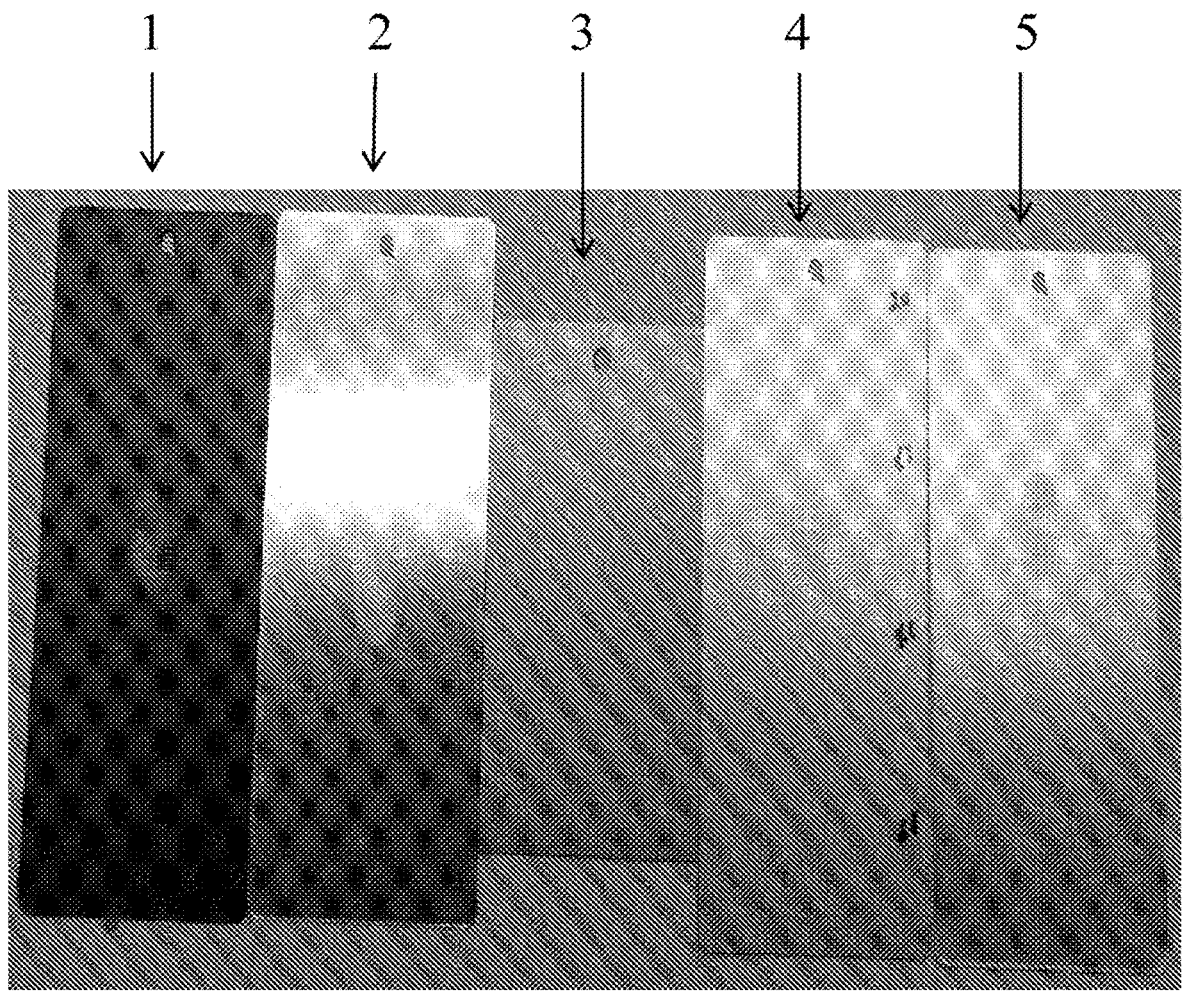
FIG. 2 is a photographic representation of a comparison of metal test panels coated with different powder compositions with a fingerprint deposited thereon.

Test panels were prepared and coated with the powder compositions as shown in Table 2 below using the procedure as described in Example 1. The panels were heated to cure the coating and an oily fingerprint was deposited in the center of each panel. The panels were then observed under white light. Results are shown in FIG. 2.

TABLE 2

Powder Compositions for Antifingerprinting Effect Comparison

| Panel | Powder Composition |
|---|---|
| 1 | Low gloss TGIC (black) |
| 2 | High gloss TGIC (clear) |
| 3 | Inventive coating (clear) |
| 4 | Low gloss primid (clear) |
| 5 | Low gloss TGIC (clear) |

Example 3

Self-Healing Coating

Figure 3:
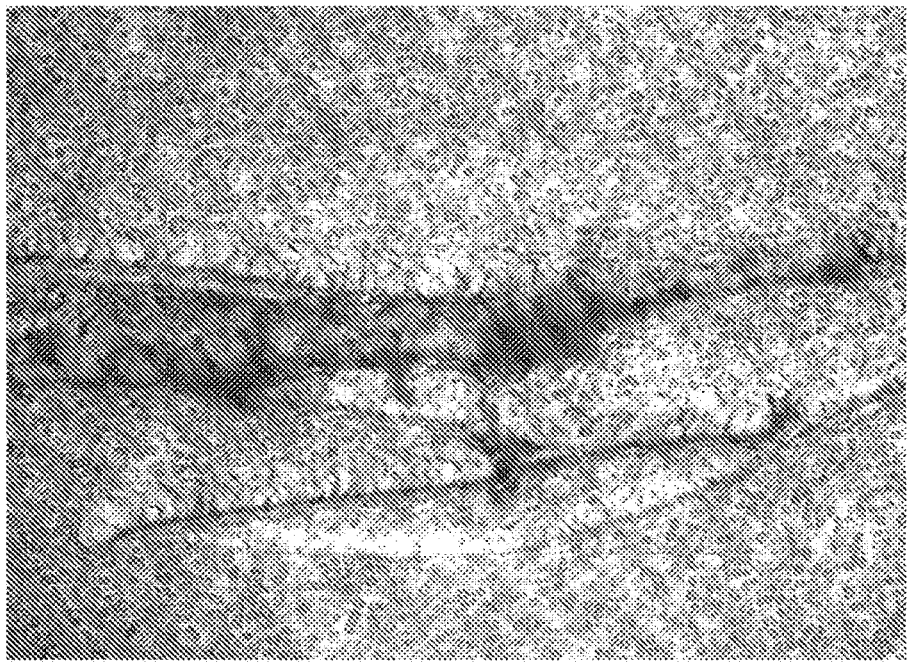
FIG. 3 is a photographic representation of microscope images of a scratched coating compared with the same coating after the scratch has healed.
Figure 3:
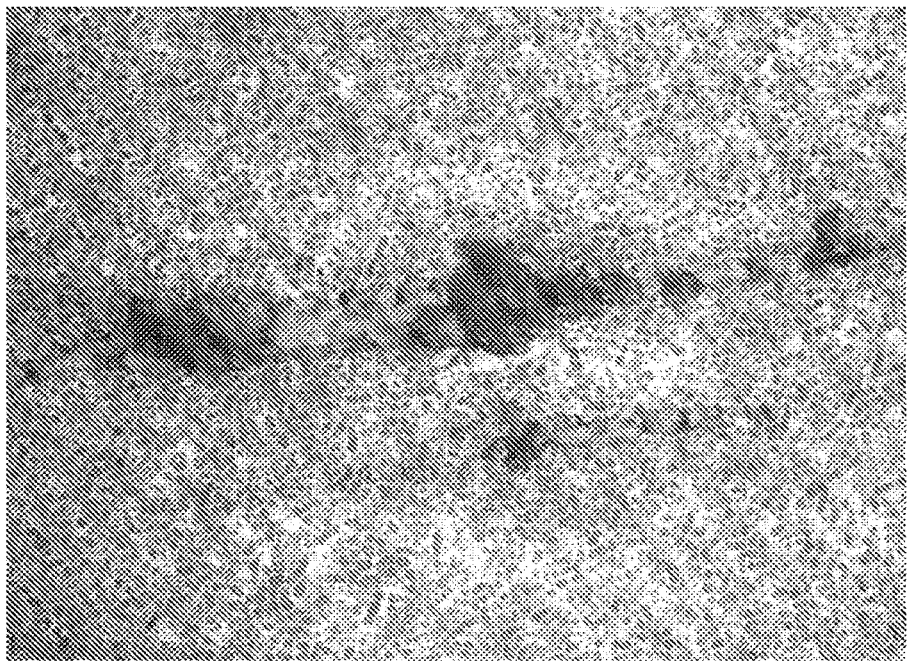

To assess the self-healing properties of the coating, metal test panels were prepared as described in Example 1 and coated with one of two powder compositions as described herein. Powder #1 included the first resin component along with a UV absorbing marker, the second resin component, and a crosslinker. Powder #2 included the second resin component with a UV absorbing marker, the first resin component, and a crosslinker. Each test panel was heated to form a cured coating on the panels. A scratch having depth of about 50 μm was made on the coating surface on each panel. The panels were then heated to about 95° C. and the scratch on each panel was visually observed using microscope imaging. Results are shown in FIG. 3.

Example 4

Barrier Properties

Figure 4:
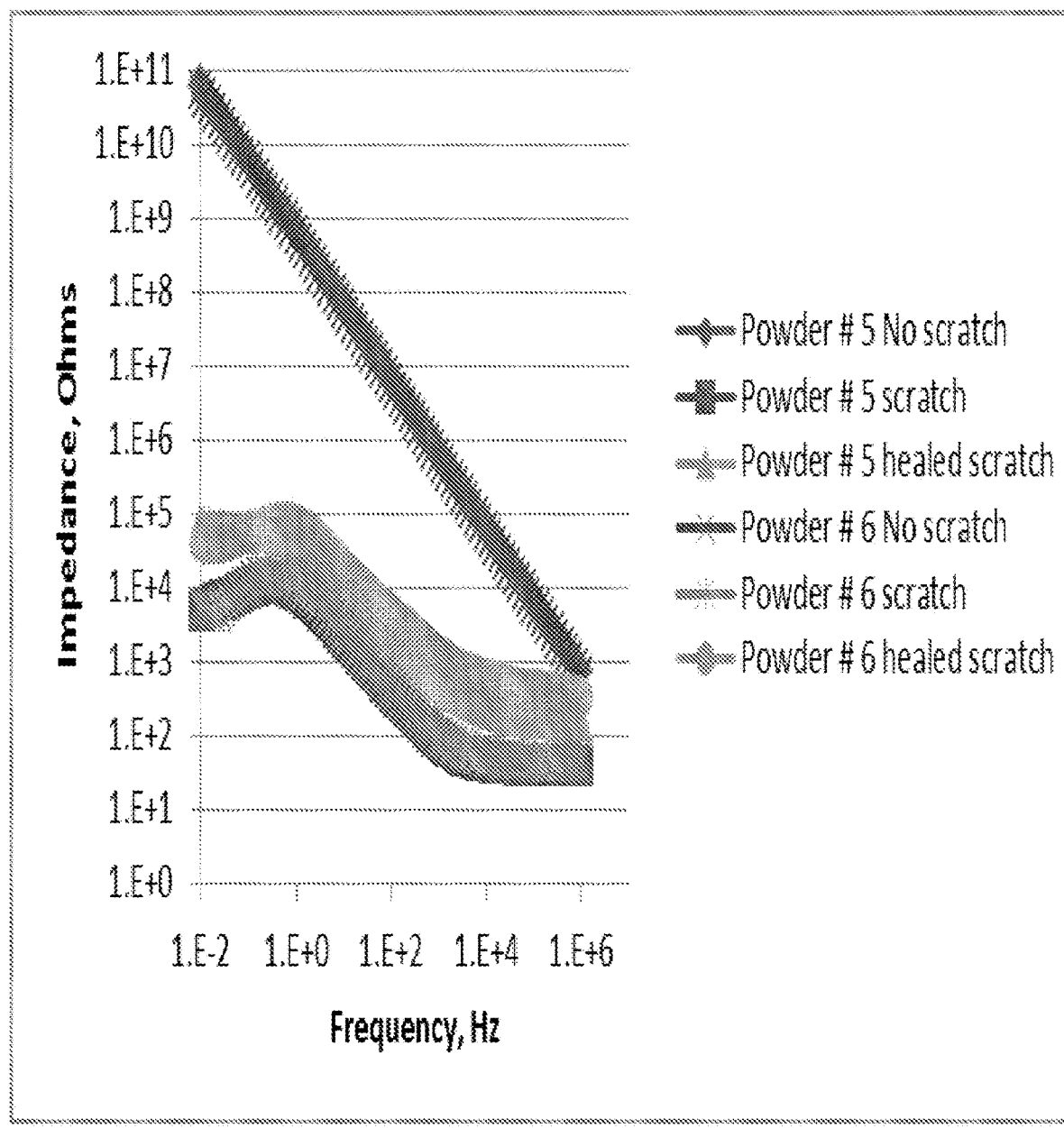
FIG. 4 is a graphical representation of the electrochemical impedance spectroscopy (EIS) study for metal test panels coated with various powder compositions.

To assess the self-healing properties of the coating composition described herein in terms of barrier properties, neat samples of Powder #1 and Powder #2 of Example 3 were used as controls in an electrochemical impedance spectroscopy (EIS) study. Test panels were prepared as described in Example 3. A deep scratch all the way to the metal surface was made in each test panel and the panels and neat samples were analyzed by EIS. Results are reported graphically in FIG. 4.

Example 5

Chemical Agent Resistance

To assess the chemical agent resistant properties of the coating compositions described herein, test panels were prepared by electrostatic spray application of the low gloss inventive composition shown in Table 1 on commercially available metal panels. A series of tests were conducted on the coated panels to determine if the coatings are chemical agent resistant coatings (CARC) according to military specifications for such coatings. Results are shown in Table 3.

TABLE 3

Chemical Agent Resistance Testing

| Test | Test Method | Requirement | Pass/Fail |
|---|---|---|---|
| NaOH Immersion - Ambient | Internal | N/A | N/A |
| NaOH Immersion - 60 C. | Internal | N/A | N/A |
| STB Spot Test - 30 min | MIL-PRF-32348 | No Blistering | Pass |
|  |  | No Wrinkling | Pass |
|  |  | ΔHardness ≤ 2 | Pass |
|  |  | ΔE ≤ 2.5 | Pass |
| STB Spot Test - 30 min | MIL-PRF-32348 | No Blistering | Pass |
|  |  | No Wrinkling | Pass |
|  |  | ΔHardness ≤ 2 | Pass |
|  |  | ΔE ≤ 2.5 | Pass |
| STB Spot Test - 60 min | MIL-PRF-32348 | No Blistering | Pass |
|  |  | No Wrinkling | Pass |
|  |  | ΔHardness ≤ 2 | Pass |
|  |  | ΔE ≤ 2.5 | N/A |
| UV | Whirlpool T-613 | ≤1.5 ΔLab | Pass |
| WOM | GE F50LB44 | No visual change | Pass |
| Salt Fog - 500 hours | Whirlpool T-23 | ≤3.2 mm Creepage | Pass |
|  |  | 6-F Blisters Max | Pass |
|  |  | 9 Rust Max | Pass |
| Salt Fog - 1000 hours | Internal | N/A | N/A |
| Humidity | Whirlpool T-22 | 8-F Blister Max | Pass |
|  |  | ΔHardness ≤ 1 | Pass |
|  |  | 3B Adhesion | Pass |
|  |  | ≤3.2 mm Creepage | Pass |
|  |  | 9 Rust Max | Pass |
| Detergent 120 hours | Whirlpool T-18 & GE F50LB44 | 8-F Blister Max | Pass |
|  |  | ΔHardness ≤ 1 | Pass |
|  |  | 3B Adhesion | Pass |
|  |  | ≤3.2 mm Creepage | Pass |
|  |  | 9 Rust Max | Pass |
| Detergent 240 hours | Whirlpool T-18 & GE F50LB44 | 8-F Blister Max | Pass |
|  |  | ΔHardness ≤ 1 | Pass |
|  |  | 3B Adhesion | Pass |
|  |  | ≤3.2 mm Creepage | Pass |
|  |  | 9 Rust Max | Pass |
| Stain | Whirlpool T-16 & GE F50LB44 | No visual change | Pass |
|  |  | No gloss change | Pass |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A coating composition, comprising:
   a polyurethane binder resin system comprising:
   a first resin component with a hydroxyl number of 150 to 240;
   a second resin component with a hydroxyl number of 15 to 35,
   wherein the difference in hydroxyl number of the first and second resin component is 135 to 215; and
   a hydroxyl-reactive crosslinker,
   wherein the coating composition is substantially free of filler, and
   wherein a cured coating formed from the coating composition has oleophobic and hydrophobic properties, and has 60°-gloss of less than about 5.

2. The composition of claim 1, wherein a cured coating formed from the composition has 20°-gloss of less than about 1.

3. The composition of claim 1, wherein a cured coating formed from the coating composition has surface roughness (Rz) of about 10 to 30 μm.

4. The composition of claim 1, wherein the first resin component is a hydroxyl-functional polyester.

5. The composition of claim 1, wherein the second resin component is a hydroxyl-functional polyester.

6. The composition of claim 1, wherein the hydroxyl-reactive crosslinker is an isocyanate.

7. The composition of claim 1, wherein the hydroxyl-reactive crosslinker is a blocked isocyanate.

8. The composition of claim 1, wherein the first resin component has Tg of about 40° C. to 70° C.

9. The composition of claim 1, wherein the second resin component has Tg of about 40° C. to 70° C.

10. The composition of claim 1, wherein the difference in Tg (ΔTg) of the first and second resin components is no more than 10° C.

11. The composition of claim 1, wherein the crosslinker is present in NCO:OH ratio of 1:1.5 to 1:1.1.

12. The composition of claim 1, wherein a cured coating formed from the composition has self-healing effect when an external thermal stimulus is applied.

13. The composition of claim 1, wherein a cured coating formed from the composition has self-healing effect at ambient temperature.

14. The composition of claim 1, wherein a cured coating formed from the composition has self-healing effect at temperatures of above 90° C.

15. A coating composition, comprising a polyurethane binder resin system comprising:
   a first resin component with a hydroxyl number of 150 to 240;
   a second resin component with a hydroxyl number of 15 to 35,
   wherein the difference in hydroxyl number of the first and second resin component is 135 to 215;
   a hydroxyl-reactive crosslinker, and
   wherein a cured coating formed from the coating composition has oleophobic and hydrophobic properties, and has 60°-gloss of less than about 5, and
   wherein the composition comprises less than 5 wt % filler, based on the total weight of the composition.

* * * * *